(12) United States Patent
Kuzukawa (10) Patent No.: US 7,604,223 B2
(45) Date of Patent: Oct. 20, 2009

(54) LIQUID SEAL TYPE FLUID-FILLED MOUNT

(75) Inventor: Mitsuo Kuzukawa, Ageo (JP)

(73) Assignee: Fukoku Co., Ltd., Saitama (JP)

( * ) Notice: Subject to any disclaimer, the term of this patent is extended or adjusted under 35 U.S.C. 154(b) by 0 days.

(21) Appl. No.: 10/974,835

(22) Filed: Oct. 28, 2004

(65) Prior Publication Data

US 2005/0056980 A1 Mar. 17, 2005

Related U.S. Application Data

(63) Continuation of application No. PCT/JP03/05477, filed on Apr. 28, 2003.

(30) Foreign Application Priority Data

May 1, 2002 (KR) .................... 10-2002-0023931

(51) Int. Cl.
*F16F 13/00* (2006.01)
(52) U.S. Cl. .................... 267/140.13; 267/141.1; 267/141.4
(58) Field of Classification Search .......... 267/140.11, 267/140.13, 141.1, 141.2, 141.3, 141.4, 141.5, 267/141.6, 141.7
See application file for complete search history.

(56) References Cited

U.S. PATENT DOCUMENTS

| | | | | |
|---|---|---|---|---|
| 1,650,742 A | * | 11/1927 | Rowan | 267/225 |
| 3,721,417 A | * | 3/1973 | Skala et al. | 267/140.11 |
| 4,503,951 A | * | 3/1985 | Imaizumi | 188/280 |
| 4,921,049 A | | 5/1990 | Kaiser | |
| 5,020,782 A | | 6/1991 | Freudenberg | |
| 5,310,168 A | * | 5/1994 | Tanahashi | 267/140.12 |
| 5,433,421 A | | 7/1995 | Ishiyama | |
| 5,498,060 A | | 3/1996 | Satomi | |
| 5,707,048 A | * | 1/1998 | Kuzukawa et al. | 267/140.13 |
| 5,988,610 A | | 11/1999 | Hiraki | |

(Continued)

FOREIGN PATENT DOCUMENTS

JP     55-104515 U     7/1980

(Continued)

OTHER PUBLICATIONS

International Search Report Dated Aug. 5, 2003.

*Primary Examiner*—Robert A Siconolfi
*Assistant Examiner*—Mariano Sy
(74) *Attorney, Agent, or Firm*—Rader, Fishman & Grauer, PLLC (57) ABSTRACT

The liquid seal type fluid-filled mount comprises a cup-shaped housing (1) having a flange (1A) provided with a mounting hole; a stud (3) disposed along a central axis of the cup-shaped housing so as to be positioned in a central opening of a fixed damping unit; a flexible seal cap (7) sealing fluid-tight between the upper end of the stud and the cup-shaped housing; a high viscosity liquid (2) for being filled in a chamber formed by the cup-shaped housing (1) and the flexible seal cap (7); a movable damping plate (4) mounted to a lower end of the stud (3); a fixed damping unit (10) being fixed between the flexible seal cap (7) and the movable damping plate (4) and placed in the high viscosity fluid; and a spring (13) disposed between a bottom of the cup-shaped housing (1)and the movable damping plate (4).

7 Claims, 10 Drawing Sheets

U.S. PATENT DOCUMENTS

| | | | | |
|---|---|---|---|---|
| 6,279,693 | B1 * | 8/2001 | Wiebe | 188/129 |
| 6,702,267 | B2 * | 3/2004 | Schleinitz et al. | 267/226 |
| 6,715,745 | B2 * | 4/2004 | Nakada et al. | 267/140.13 |

FOREIGN PATENT DOCUMENTS

| | | | |
|---|---|---|---|
| JP | 61-084430 | A | 4/1986 |
| JP | 07-127683 | A | 5/1995 |
| JP | 09-166174 | A | 6/1997 |
| JP | 2002-227910 | A | 8/2002 |
| JP | 2002-357238 | A | 12/2002 |
| JP | 2003-049893 | A | 2/2003 |

* cited by examiner

LIQUID SEAL TYPE FLUID-FILLED MOUNT

This application is a continuation of PCT/JP03/05477, filed Apr. 28, 2003.

FIELD OF THE INVENTION

The present invention relates to a liquid seal type fluid-filled mount comprising a movable damping plate and a fixed damping unit, which is advantageous in terms of enlarged vertical strokes and high damping effect.

BACKGROUND OF THE INVENTION

As well known to those skilled in the art, a conventional liquid seal type fluid-filled mount, capable of enlarging vertical strokes, is disclosed in Japanese Patent Laid-open Publication No. H7-127683.

The liquid seal type fluid-filled mount disclosed in Japanese Patent Laid-open Publication No. H7-127683 is as follows. A damping plate is disposed at a lower end of a stud that supports a target vibrating material. The damping plate is housed in a cup-shaped housing with a closed bottom portion, and in the same time, a viscous fluid is filled in the cup-shaped housing (i.e. a liquid seal type fluid-filled mount). The liquid seal type fluid-filled mount further comprises a spring for absorbing impact disposed between the damping plate and the bottom portion of the cup-shaped housing. In addition, an elastic cylindrical body is fixed at a top portion of the cup-shaped housing and the stud is fitted into the elastic cylindrical body to be axially slidable, via a sleeve being placed between the stud and the elastic cylindrical body.

A liquid seal type fluid-filled mount of a type mentioned as above can have a large vertical stroke and high damping effect.

However, as for such a conventional liquid seal type fluid-filled mount, the elastic cylindrical body should be mounted at the top portion of the cup-shaped housing and the sleeve should be disposed inside the elastic cylindrical body. Further, in order to enclose a space between an inner surface of the sleeve and an outer surface of the stud, bellows should be integrally connected between a lower end of the elastic cylindrical body and the movable damping plate.

Furthermore, the stud should be installed to be axially slidable in the sleeve.

As explained above, the conventional liquid seal type fluid-filled mount has a complicated structure, with a service life of the bellows being short, and also risking possible leakage of high viscosity fluid.

DISCLOSURE OF THE INVENTION

Accordingly, the object of the present invention is to provide a liquid seal type fluid-filled mount comprises a movable damping plate and a fixed damping unit.

Another object of the present invention is to provide a liquid seal type fluid-filled mount that enables high damping effect.

Yet another object of the present invention is to provide a liquid seal type fluid-filled mount that enables large strokes.

Still another object of the present invention is to provide a liquid seal type fluid-filled mount with a simple structure in sealing a high viscosity fluid.

A still further object of the present invention is to provide a liquid seal type fluid-filled mount with improved strength against lateral impact using a simple structure.

A still further object of the present invention is to provide a liquid seal type fluid-filled mount capable of damping external high frequency vibrations using a simple structure.

A still further object of the present invention is to provide a liquid seal type fluid-filled mount capable of obtaining high damping effect even though a stud is tilted by inclined lateral impact from outside.

To achieve the above objects, the present invention provides a liquid seal type fluid-filled mount comprising a cup-shaped housing having a flange provided with a mounting hole; a stud, having an upper end and a lower end, with a threaded hole provided at the upper end thereof and being disposed along a central axis of the cup-shaped housing; a flexible seal cap sealing fluid-tight between the upper end of the stud and the cup-shaped housing; a high viscosity liquid for being filled in a chamber formed by the cup-shaped housing and the flexible seal cap; a movable damping plate mounted to the lower end of the stud and placed in the high viscosity fluid; a fixed damping unit, having a doughnut-shape with an opening at a center of the doughnut being a central opening in which the stud is positioned, being fixed between the flexible seal cap and the movable damping plate and placed in the high viscosity fluid; a spring disposed between a bottom of the cup-shaped housing and the movable damping plate; a first fluid passage formed between an inner circumferential surface of the cup-shaped housing and an outer circumferential surface of the movable damping plate; and a second fluid passage formed between an inner surface of the central opening of the fixed damping unit and an outer circumferential surface of the stud.

As for the liquid seal type fluid-filled mount of claim 1, the flexible seal cap has a cap body, made of a rubber material having a doughnut-shape and a holder, having a flange portion and a cylindrical portion, and the cylindrical portion is vulcanized to an outer circumferential side of the cap body.

As for the liquid seal type fluid-filled mount of claim 1, the flexible seal cap has a layered cap, and a holder, having a flange portion and a cylindrical portion, and the cylindrical portion is vulcanized to an outer circumferential side of the layered cap and the layered cap has N number of elastic materials such as rubber rings being formed into cylindrical shape, and N-1 number of bushes, and the elastic materials and the bushes are being alternately layered.

As for the liquid seal type fluid-filled mount of claim 1, the fixed damping unit has a holder, and a damping body made of an elastic material such as rubber having a predetermined thickness.

As for the liquid seal type fluid-filled mount of claims 1, the central opening formed at a center of the fixed damping unit has at least one groove at an inner surface thereof.

As for the liquid seal type fluid-filled mount, of claims 1, the central opening formed at the center of the fixed damping unit has a tapered opening.

As for the liquid seal type fluid-filled mount of claims 1, the movable damping plate is disposed to the lower end of the stud so that the plate is slightly movable in a vertical direction.

BEST MODE FOR CARRYING OUT THE INVENTION

Reference will now be made in detail to the present preferred embodiments of the present invention.

Figure 1:
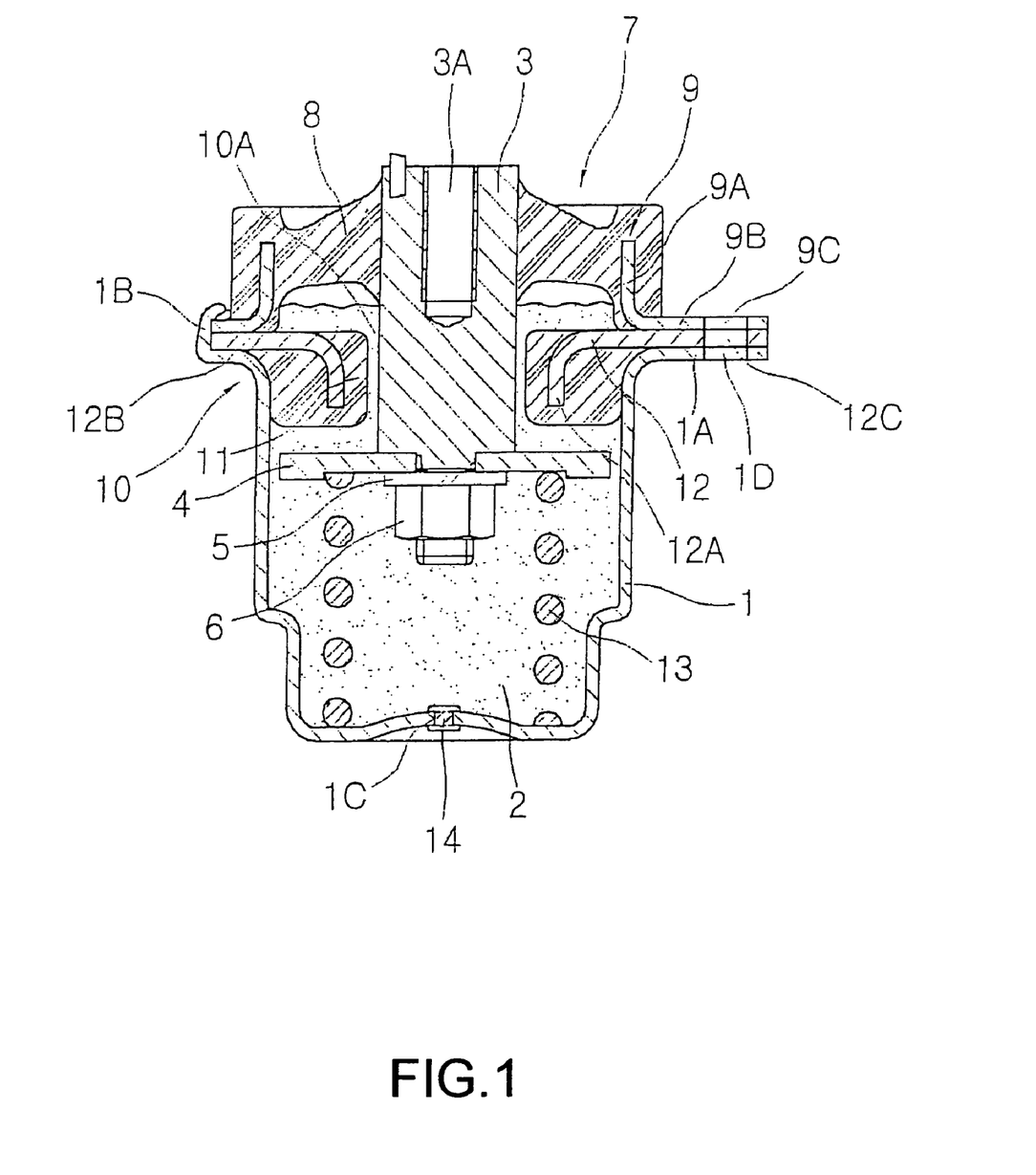
FIG. 1 is a sectional view of a liquid seal type fluid-filled mount, according to one embodiment of the present invention.

FIG. 1 illustrates a liquid seal type fluid-filled mount according to one embodiment of the present invention in which the reference numeral 1 designates a cup-shaped housing. The cup-shapedhousing 1 is disposed with a flange 1A and a caulked portion 1B at a top portion thereof, and a fluid injection hole 1C for injecting high viscosity fluid 2 at a bottom portion thereof. In addition, a mounting-hole 1D is formed at the flange 1A. A stud 3 is disposed along a central axis of the cup-shaped housing 1, and a threaded-hole 3A for mounting the stud 3 to a target material is axially formed at an upper end of the stud 3. In addition, a movable damping plate 4 is mounted to a lower end of the stud 3 with a spring washer 5 and a nut 6. A flexible seal cap 7 is composed of a cap body 8 and a holder 9.

The cap body 8, for example, is made of a rubber material being formed to a doughnut shape, and a center hole of the doughnut-shaped cap body 8 is vulcanized to an upper portion of the stud 3, sealed fluid-tight. In addition, the holder 9 is provided with a cylindrical portion 9A and a flange portion 9B. The cylindrical portion 9A of the holder 9 is vulcanized to an outer peripheral side of the cap body 8, sealed fluid-tight. The flange portion 9B is formed with a mounting-hole 9C.

A fixed damping unit 10 has a central opening 10A at a center thereof and is provided with a damping body 11 and a holder 12. A second fluid passage is formed between an inner surface of the central opening 10A and an outer circumferential surface of the stud 3.

The damping body 11, which is made of, for example, a rubber material, and the central opening 10A is located at a center thereof. The holder 12 of the fixed damping unit 10 has a cylindrical portion 12A and a flange portion 12B and the damping body 11 is vulcanized to the cylindrical portion 12A.

The flange portion 12B has a mounting-hole 12C.

A coil spring 13 is disposed between the bottom of the cup-shaped housing 1 and the movable damping plate 4. The reference numeral 14 is a plug. The plug body 14 is fitted into the fluid injection hole 1C formed at the bottom of the cup-shaped housing 1, sealed fluid-tight.

Further, the cup-shaped housing 1 forms a liquid-seal type container with the flexible seal cap 7 and high viscosity fluid 2 is disposed therein. As such, the high viscosity fluid 2 may be poured into the sealed housing 1 through the fluid injection hole 1C formed at the bottom of the cup-shaped housing 1.

As for the damping operation of the liquid seal type fluid-filled mount, the high viscosity fluid 2 passes through a first fluid passage formed between an inner circumferential surface of the cup-shaped housing 1 and an outer circumferential surface of the movable damping plate 4, thereby exhibiting damping effect. Further, the high viscosity fluid 2 passes through a second fluid passage formed between an inner surface of the central opening 10A of the fixed damping unit 10 and the outer circumferential surface of the stud 3, thereby exhibiting additional damping effect which results in even higher damping effect.

The vertical stroke of the movable damping plate 4 may be enlarged by a change in the design of the flexible seal cap 7 and the coil spring 13.

Further, since a thickness (vertical height) of the fixed damping unit 10 may be increased, the fixed damping unit 10 may provide higher damping effect compared to a fixed damping unit with a thin plate.

The cylindrical portion 9A of the holder 9 of the flexible seal cap 7, together with the cap body 8 made of a rubber material of the cylindrical portion 9A, functions as a stopper for a vibration-proof portion not shown in the figure.

Figure 2:
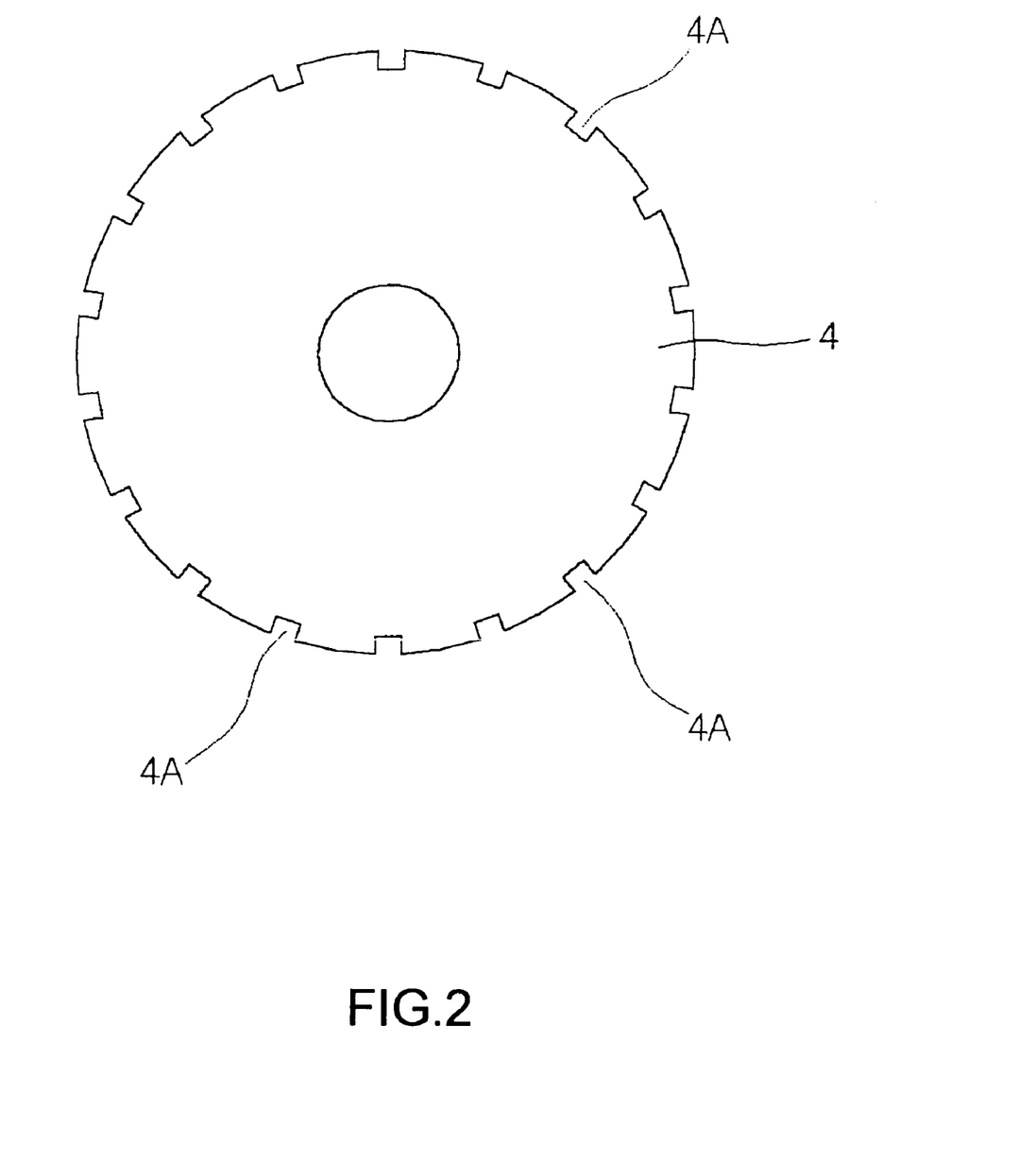
FIG. 2 is another embodiment of a plan view of a movable damping plate in the liquid seal type fluid-filled mount shown in FIG. 1.

Although the outer circumferential surface of the movable damping plate 4 is formed to be smooth in the embodiment explained above, it may be formed with a plurality of grooves 4A, for example, 18 grooves 4A as shown in FIG. 2.

Figure 3:
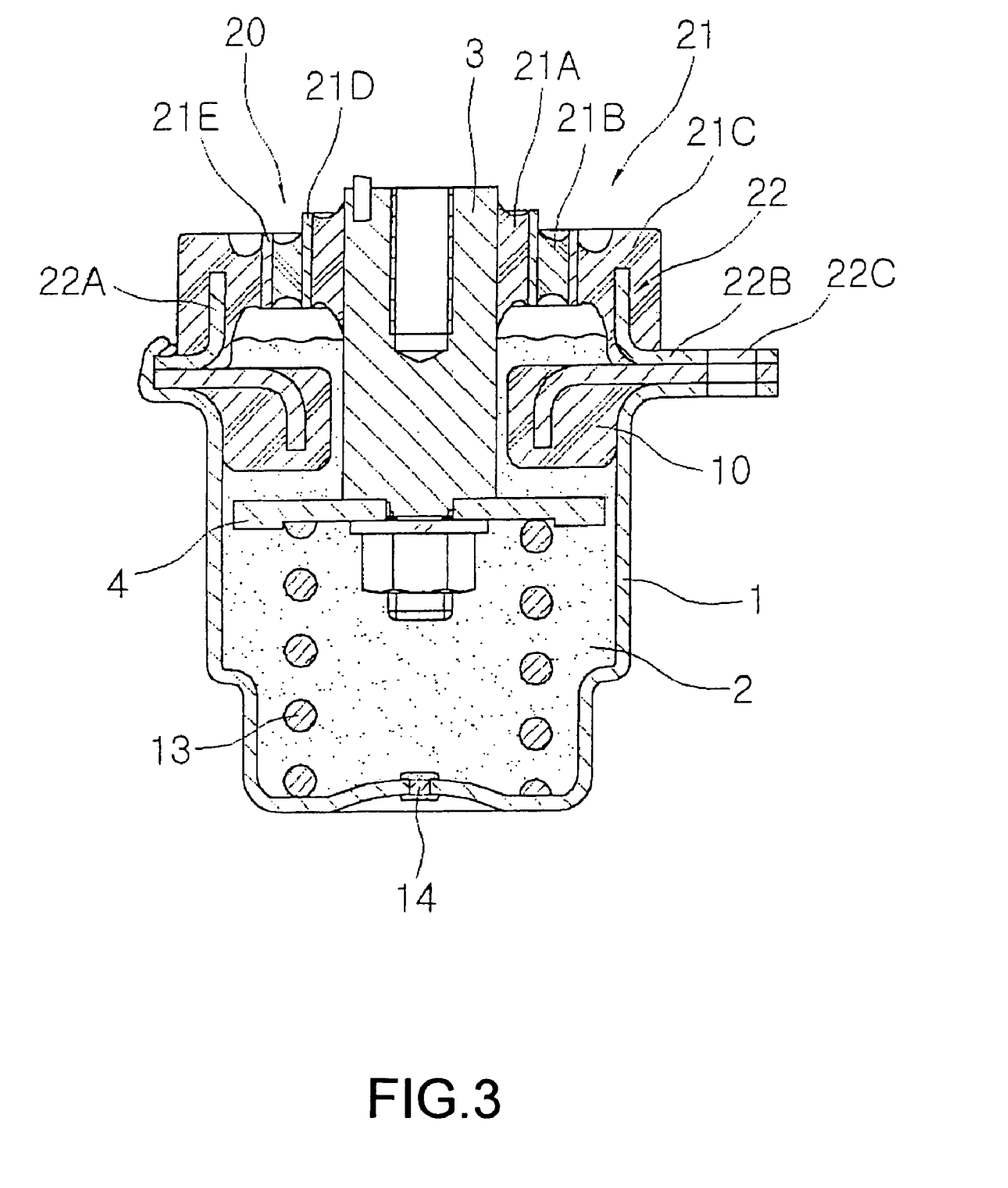
FIG. 3 is a sectional view of a liquid seal type fluid-filled mount according to another embodiment of the present invention.

FIG. 3 illustrates a liquid seal type fluid-filled mount according to another embodiment of the present invention, in which the reference numeral 20 designates a flexible seal cap. The flexible seal cap 20 is provided with a layered cap 21 and a holder 22. The layered cap 21 has three rubber rings 21A, 21B and 21C and two bushes 21D and 21E, alternately vulcanized. An inner surface of the rubber ring 21A is vulcanized to the top portion of the stud 3.

The holder 22 includes a cylindrical portion 22A and a flange portion 22B, in which the cylindrical portion 22A is vulcanized to the rubber ring 21C. The flange portion 22B is formed with a mounting-hole 22C.

The flexible seal cap 20 having the above setup is mounted fluid-tight at the top portion of the cup-shaped housing 1 is as described in FIG. 1.

The liquid seal type fluid-filled mount according to the embodiment of the present invention has damping effect as high as the liquid seal type fluid-filled mount according to the embodiment illustrated in FIG. 1. Even though being subjected to high lateral impact, that is, inclined impact, the stud 3 is not easily tilted due to the flexible seal cap 20. Thus there is no reduction of damping effect.

Although the layered cap 21 comprises alternately layered three rubber rings and two bushes, N rubber rings and N-1 bushes may be alternately layered.

Figure 4:
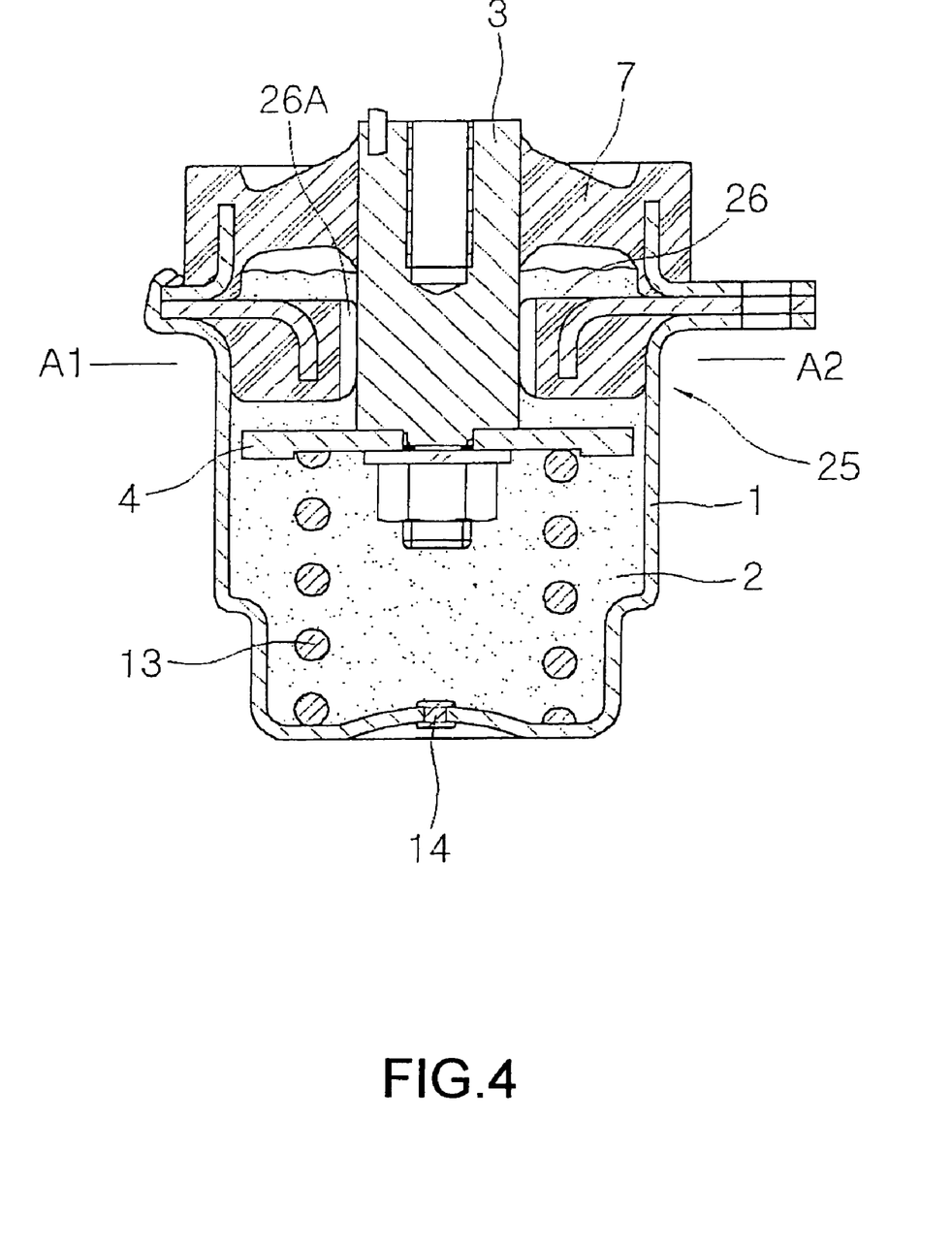
FIG. 4 is a sectional view of a liquid seal type fluid-filled mount according to yet another embodiment of the present invention.
Figure 5:
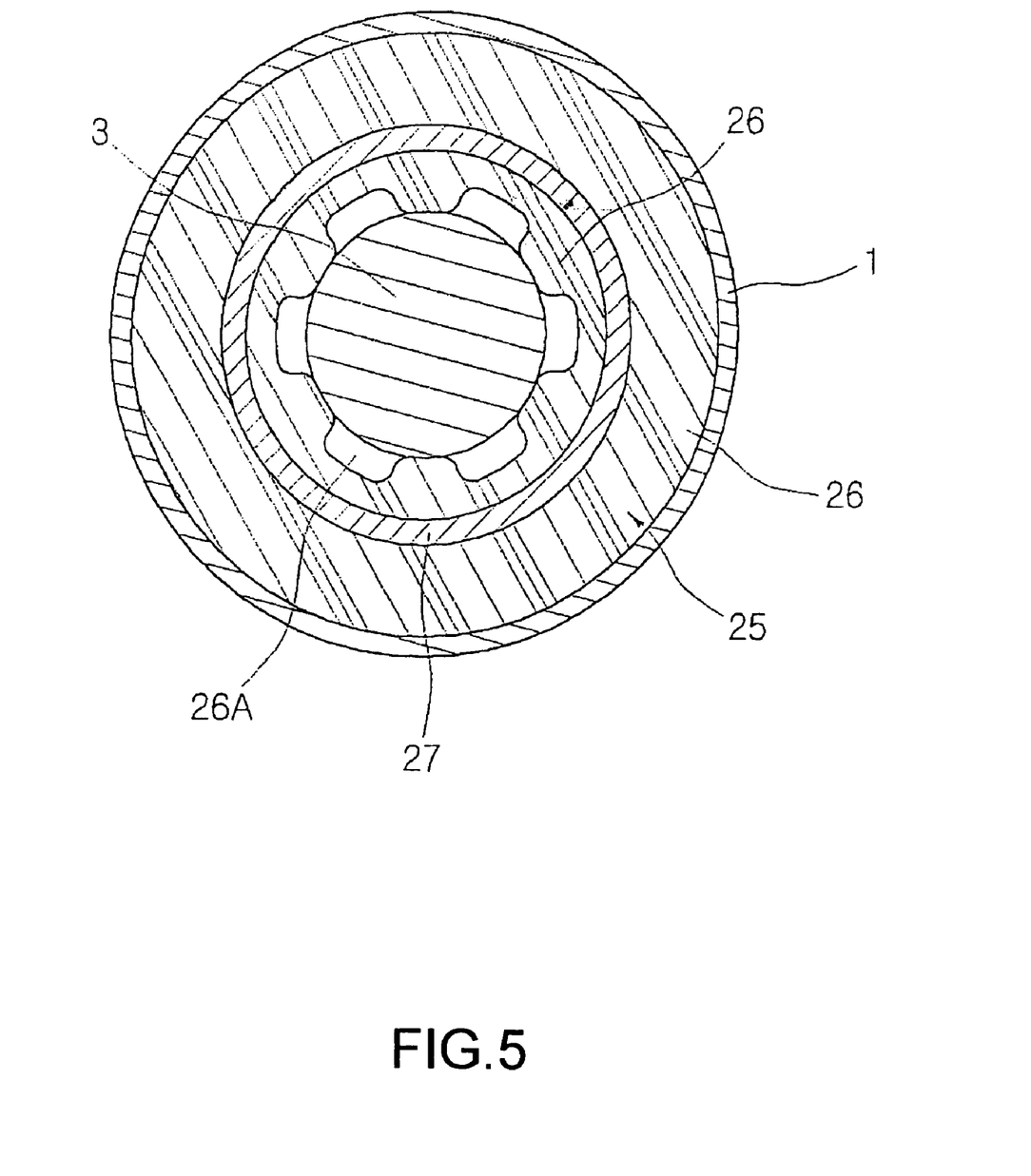
FIG. 5 is a sectional view taken along the A1-A2 line shown in FIG. 4.

FIG. 4 illustrates a liquid seal type fluid-filled mount according to yet other embodiment of the present invention, and FIG. 5 illustrates a section of the line A1-A2 shown in FIG. 4. In the figure, a sliding-type fixed damping unit 25 includes a damping body 26 and a holder 27.

As shown in FIGS. 4 and 5, a part of an inner surface of the damping body 26 comes into contact with the outer circumferential surface of the stud 3 and also to be slidable, and, for example, six fluid passages 26A being formed.

The liquid seal type fluid-filled mount having the above setup according to the above-described embodiment of the present invention is advantageous in terms of high damping effect and high lateral strength against lateral impact.

Figure 6:
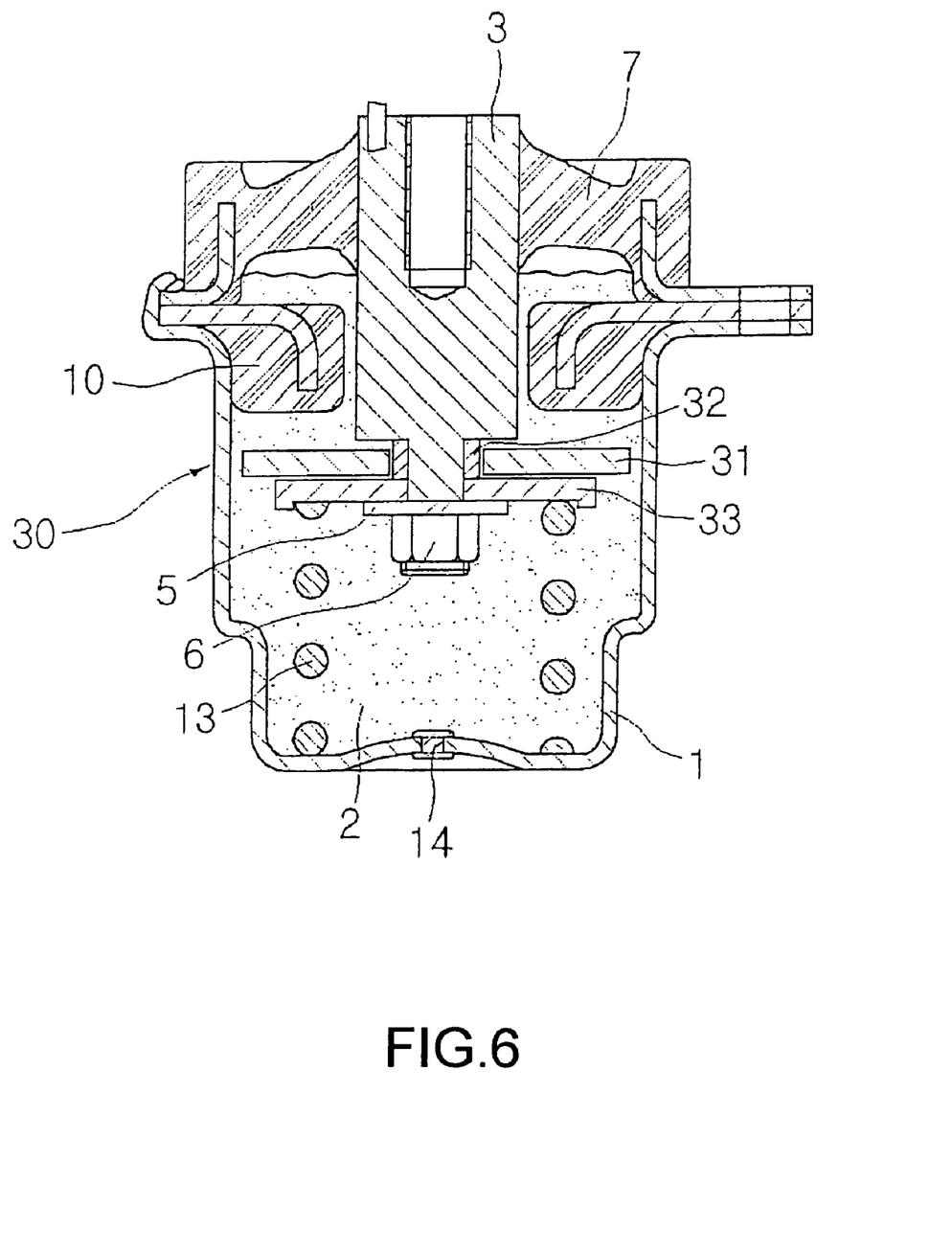
FIG. 6 is a sectional view of a liquid seal type fluid-filled mount according to still other embodiment of the present invention.

FIG. 6 illustrates a liquid seal type fluid-filled mount according to another embodiment of the present invention, in which the reference numeral 30 designates a movable damping unit for high frequency vibrations. The movable damping unit 30 for high frequency vibrations consists of a movable damping plate 31, a collar 32 and a support plate 33. The movable damping plate 31, in the state of being slightly movable in a vertical direction, is mounted to the lower end of the stud 3 by the support plate 33, a spring washer 5 and a nut 6, while the collar 32 is disposed between the damping plate 31 and the support plate 33.

When such a liquid seal type fluid-filled mount is subjected to external high-frequency vibrations, the movable damping plate 31 is slightly moved to only a height of the collar 32, thereby damping and absorbing high-frequency vibrations.

The support plate 33 is necessarily formed with a plurality of central openings (not shown), to the extent of not being deformed by the spring force of the coil spring 13.

Figure 7:
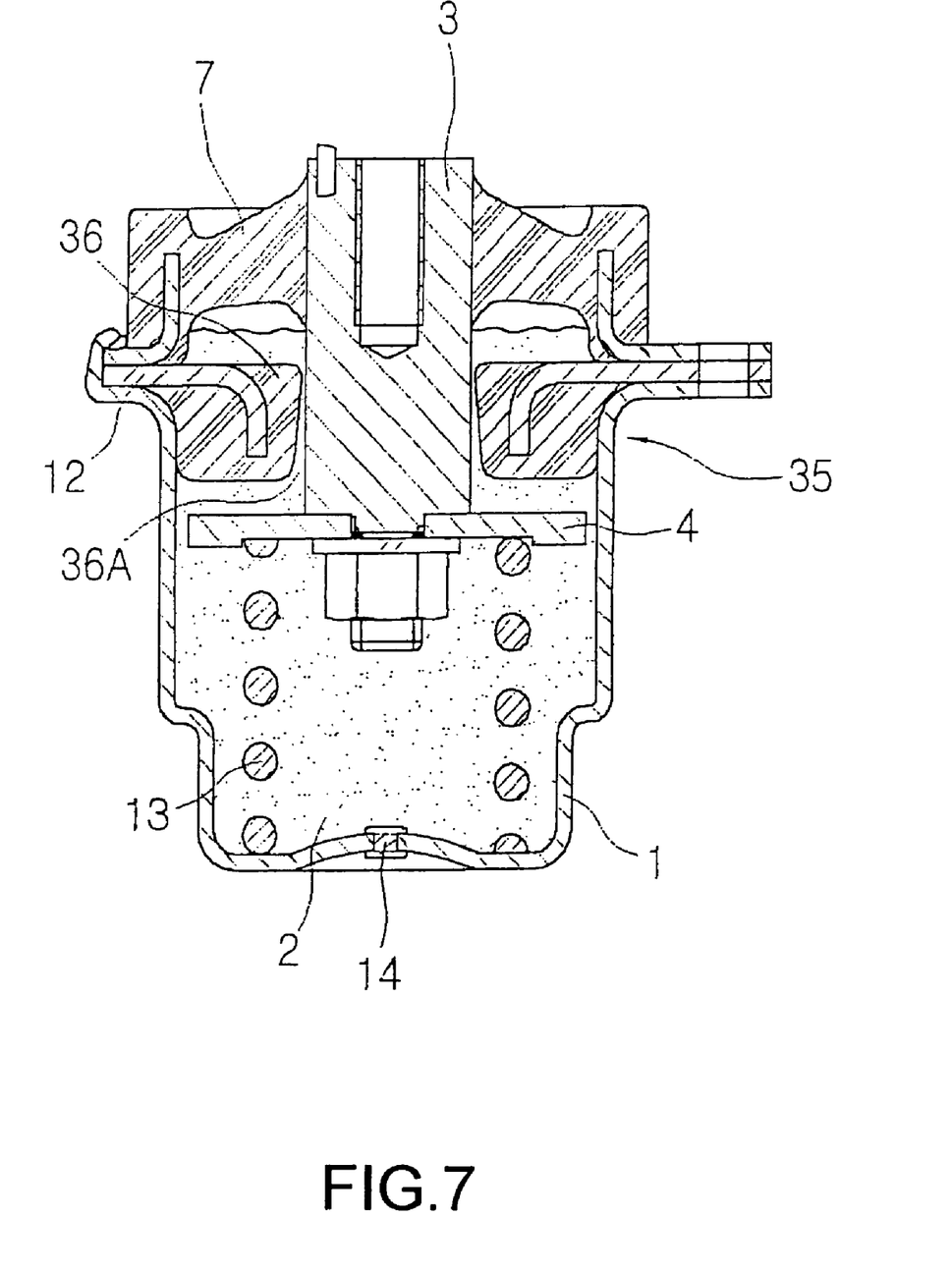
FIG. 7 is a sectional view of a liquid seal type fluid-filled mount according to another embodiment of the present invention.

FIG. 7 illustrates a liquid seal type fluid-filled mount according to another embodiment of the present invention, in which the reference numeral 35 designates a fixed damping unit for lateral impact. The fixed damping unit 35 for lateral impact includes a damping body 36 and the holder 12.

The damping body 35 is made of a rubber material, and a center thereof is formed with a tapered opening 36A. The holder 12 includes a cylindrical portion 12A and a flange portion 12B as shown in FIG. 1.

A second fluid passage is formed between the inner surface of the tapered opening 36A and the outer circumferential surface of the stud 3.

Figure 8:
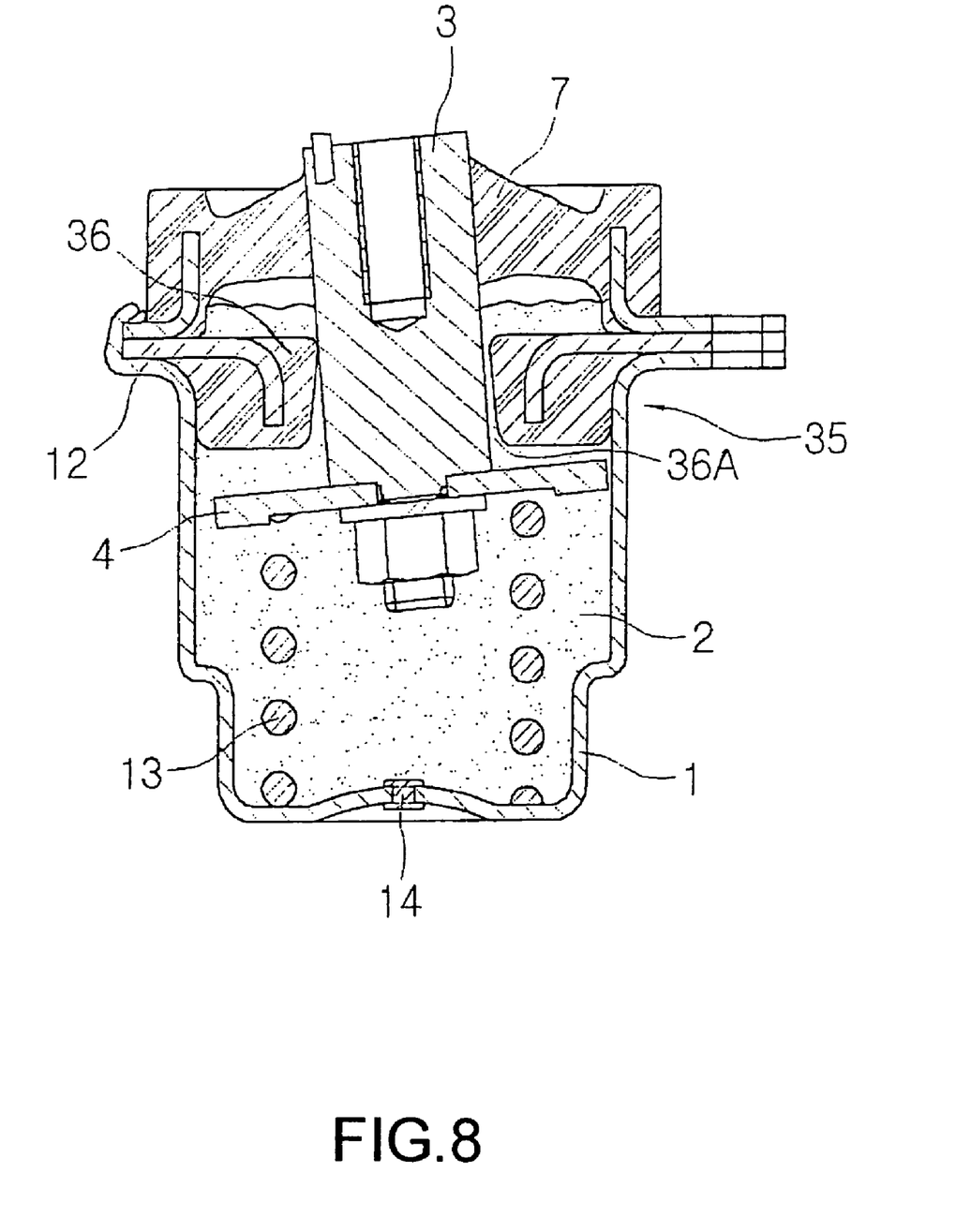
FIG. 8 is a view illustrating a damping operation shown in FIG. 7.

Turning now to FIG. 8, there is shown an action of the liquid seal type fluid-filled mount, in particular, a damping operation when the stud 3 is tilted to a side by high lateral impact.

When the stud 3 is tilted by increased lateral impact, the movable damping plate 4 is also inclined. Thus, a first fluid passage formed by the damping plate 4 is deformed, and as a result, the damping effect may decrease.

However, even though the stud 3 is tilted, the second fluid passage is ensured between the stud 3 and the tapered opening 36A of the fixed damping unit for lateral impact 35, thus exhibiting a predetermined damping effect. Hence, damping effect by the second fluid passage does not decrease and total damping effect is maintained at a desired level.

Figure 9:
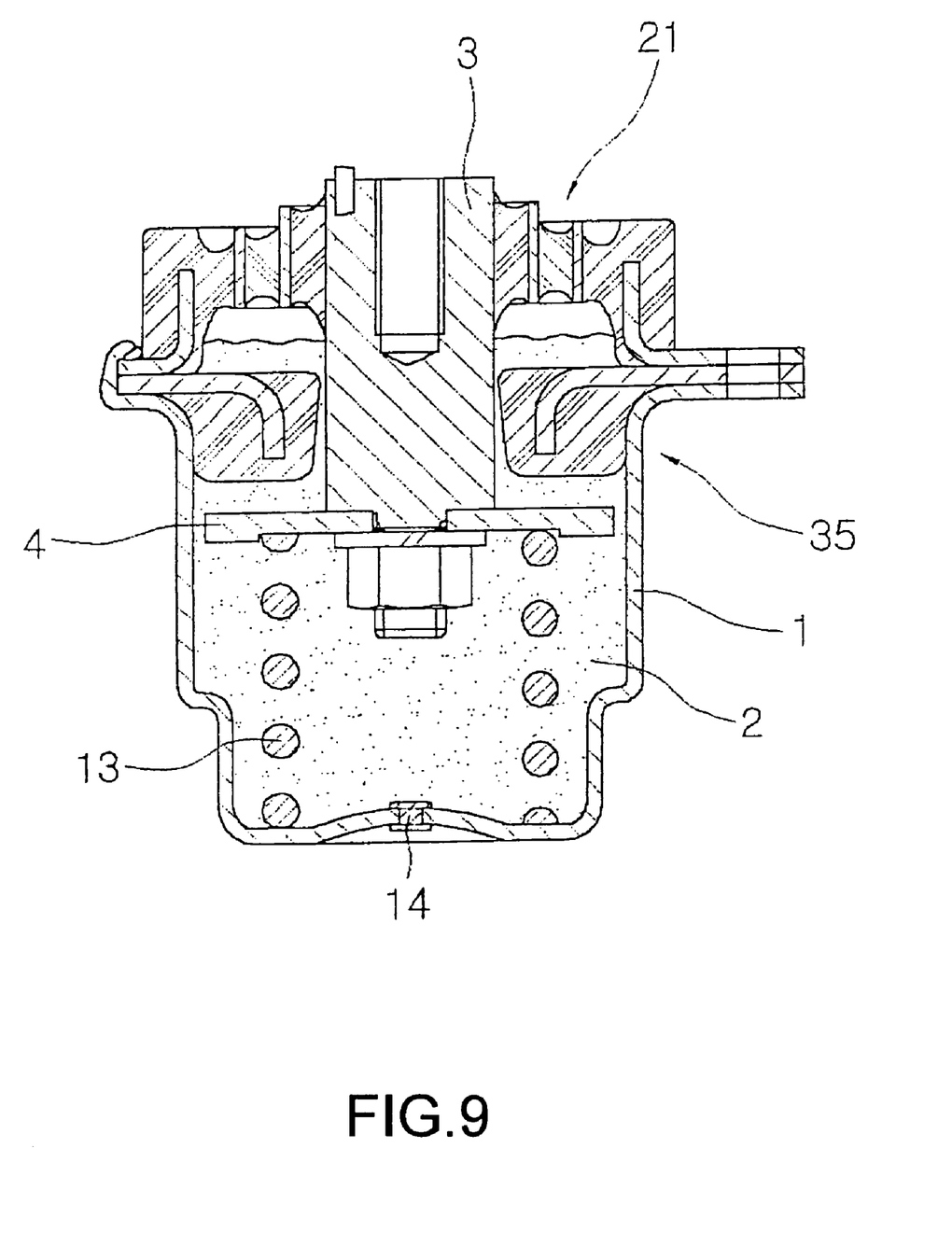
FIG. 9 is a sectional view of a liquid seal type fluid-filled mount according to yet another embodiment of the present invention.

FIG. 9 illustrates a sectional view of a liquid seal type fluid-filled mount according to another embodiment of the present invention, in which a layered cap 21 of a flexible cap 20 and a fixed damping unit 35 for lateral impact are used.

The liquid seal type fluid-filled mount of the above-described structure has advantages such as high damping effect and high lateral strength against lateral impact may be obtained.

Figure 10:
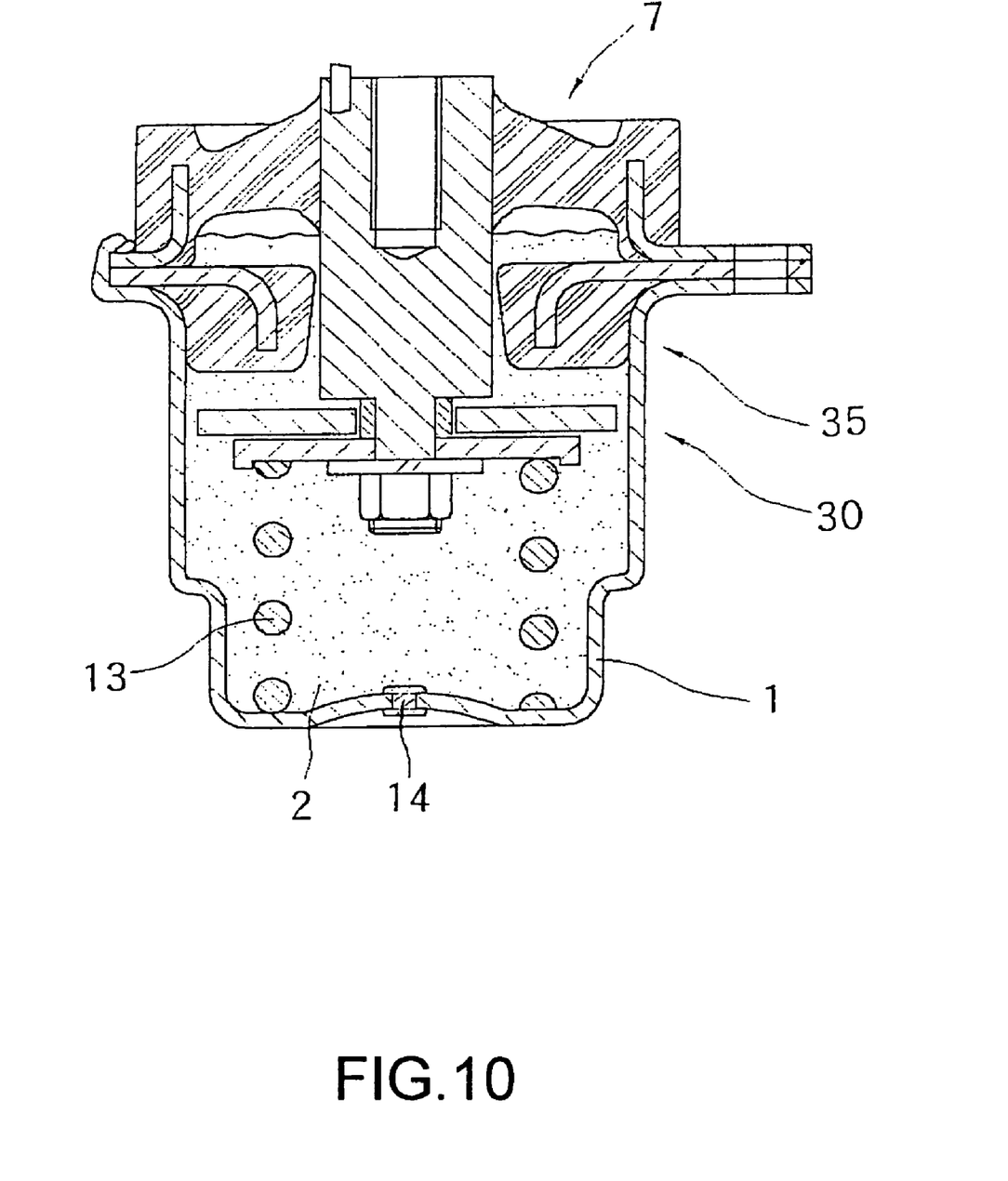
FIG. 10 is a sectional view of a liquid seal type fluid-filled mount according to still another embodiment of the present invention.

FIG. 10 illustrates a liquid seal type fluid-filled mount according to another embodiment of the present invention, in which a movable damping unit 30 for high frequency vibrations and a fixed damping unit 35 for lateral impact are used.

The liquid seal type fluid-filled mount with the above-described structure has damping effect for high frequency vibrations. Further, high damping effect may be realized even when the lateral impact is added.

Although the damping unit of the fixed damping unit is made of a rubber material in the above embodiments, limitations are not imposed on such a material.

Further, although the sidewall of the cup-shaped housing 1 is tapered downward to have a small volume, it is not limited thereto.

Furthermore, the movable damping plate is formed as a flat plate in the above embodiments. However, it is not limited thereto and may be formed as an inverted cup shape. In such a case, one end of the coil spring is placed into an inside of the inverted cup.

In addition, at least one long groove may be formed along an outer circumferential surface of the movable damping plate of the inverted cup.

The coil spring is used as a spring member in the above embodiments. However, various springs, such as conical coil springs or cylinders made of elastic materials, for example, rubber, may be used.

A section of a coiled wire of the coil spring may show rectangular or square shape as well as a circular shape (as shown in FIG. 1).

In the above embodiments, the top end and the bottom end of the coil spring are held by concave portions (as shown in FIG. 1), but may be held by convex portions.

The flexible seal cap should be formed to a thickness not to be deformed by fluid-pressure applied from the high viscosity fluid in the above embodiments. However, fabrics may be added to have resistance against strain to deform or the thickness of the cap may be thin.

Also, in the above-described embodiment, the top end of the cup-shaped housing is caulked along an edge, whereby the flange of the cup-shaped housing, the flange portion of the holder of the fixed damping unit and the flange portion of the holder of the flexible seal cap are integrated, sealed fluid-tight. However, the above-mentioned flange and flange portions may be integrated by a welding process and the like, in addition to the caulking process.

When the high viscosity fluid is filled into the housing sealed for prevention of fluid leakage and comprising the cup-shaped housing and the flexible seal cap, the fluid is injected through the fluid injection hole formed at the bottom of the cup-shaped housing in the above embodiments. However, an air vent (not shown) for exhausting air from the sealed housing may be further formed to the bottom of the cup-shaped housing in addition to the injection hole. Thereby, the high viscosity fluid may be injected into the housing sealed fluid-tight, and, at the same time, air may be exhausted from the above sealed housing to the outside. Thus a period of time required to inject the fluid may be considerably shortened. Moreover, the stud may be formed with an opening in an axial direction, through which the high viscosity fluid may be injected. In addition, the high viscosity fluid may be filled into the cup-shaped housing under vacuum first and then the housing may be sealed by the flexible seal cap.

INDUSTRIAL APPLICABILITY

As described above, the present invention provides a liquid seal type fluid-filled mount is advantageous in terms of high damping effect caused by the use of a movable damping plate and a fixing damping plate, and a large vertical stroke may be obtained caused by a flexible seal cap mounted to an upper end of a stud for prevention of fluid leakage and a spring installed at a lower end of the stud while the movable damping plate is placed between the spring and the stud.

In addition, the flexible seal cap includes a cap body and a holder, whereby a top portion of the cup-shaped housing is simply sealed not to allow leakage of the fluid. A layered cap of the flexible seal cap functions to enlarge lateral strength against lateral impact.

Further, the movable damping plate is mounted to the lower portion of the stud to be slightly movable, thus easily damping high frequency vibrations.

Furthermore, an inner surface of a central opening of the fixed damping unit comes into partial contact with an outer circumferential surface of the stud to be movable, to enlarge the strength against lateral impact. Also, the central opening of the fixed damping unit may be formed in a tapered shape, thereby exhibiting high damping effect even though the stud is tilted to a side under inclined lateral impact.

What is claimed is:

1. A liquid seal type fluid-filled mount, comprising:
a cup-shaped housing;
a stud disposed along a central axis of the cup-shaped housing, the stud having an indent portion at an outer circumferential surface thereof;
a flexible seal cap sealing fluid-tightly between an upper portion of the stud and an upper portion of the cup-shaped housing;
a high viscosity fluid filled in a chamber formed by the cup-shaped housing and the flexible seal cap;
a movable damping plate loosely set at the indent portion of the stud, a height of the indent portion being larger than a thickness of the movable damping plate so as to absorb high frequency vibration, the movable damping plate being placed in the high viscosity fluid;
a fixed damping unit disposed between the flexible seal cap and the movable damping plate and placed in the high viscosity fluid, the fixed damping unit having a doughnut-shape with a central opening in which the stud is positioned;
a supporting member disposed at the lower end of the stud; and
a spring disposed between a bottom of the cup-shaped housing and the supporting member,
wherein a first fluid passage is formed between an inner circumferential surface of the cup-shaped housing and an outer circumferential surface of the movable damping plate; and a second fluid passage is formed between an inner surface of the central opening of the fixed damping unit and an outer circumferential surface of the stud.

2. A liquid seal type fluid-filled mount as set forth in claim 1, wherein the fixed damping unit has a holder and a damping body made of an elastic material, the holder including a cylindrical portion inside the damping body of the elastic material and a flange portion fixed to the cup-shaped housing.

3. A liquid seal type fluid-filled mount as set forth in claim 2, wherein the central opening of the fixed damping unit is of a tapered shape.

4. A liquid seal type fluid-filled mount, comprising:
a cup-shaped housing having an opening at an upper portion and storing a high viscosity fluid;
a movable damping plate movably provided in the cup-shaped housing, and having an outer circumferential surface provided with a first gap being a first fluid passage for the high viscosity fluid between the outer circumferential surface and an inner circumferential surface of the cup-shaped housing, a first surface opposed to a bottom portion of the cup-shaped housing, and a second surface horizontally disposed and facing toward the opening of the cup-shaped housing;
a spring disposed between the bottom portion of the cup-shaped housing and the first surface of the movable damping plate;
a stud having a first end portion coupled to the second surface of the movable damping plate and a second end portion exposed from the opening of the cup-shaped housing;
a fixed damping unit fixed in the cup-shaped housing, the fixed damping unit including a damping body, a first cylindrical portion, and a flange portion,
the damping body made of a rubber material and having a third surface horizontally disposed and opposed to the second surface of the movable damping plate such that the third surface is in parallel with the second surface, which the second surface of the movable damping plate is capable of being in contact with, a fourth surface facing toward the opening of the cup-shaped housing, and an inner circumferential surface being tapered, the inner circumferential surface of the damping body and an outer circumferential surface of the stud being face to face with each other and forming a second gap being a second fluid passage for the high viscosity fluid, the outer circumferential surface of the stud being capable of coming into direct contact with the inner circumferential surface of the damping body, the damping body functioning, when the second surface of the movable damping plate comes into contact with the third surface, as a stopper in an axial direction of the stud, and functioning, when the outer circumferential surface of the stud comes into direct contact with the inner circumferential surface of the damping body, as a stopper in a diameter direction of the stud,
the first cylindrical portion being embedded in and attached by vulcanization to the damping body, and functioning, when the outer circumferential surface of the stud comes into direct contact with the inner circumferential surface of the damping body, as a stopper in the diameter direction of the stud in cooperation with the damping body,
the flange portion fixing the first cylindrical portion in the cup-shaped housing and being structured such that an upper end portion of the first cylindrical portion is bent;
a flexible seal cap including a lid member and a second cylindrical portion,
the lid member being flexible, being made of a rubber material formed into a doughnut shape, and being attached by vulcanization to an upper portion of the stud to elastically hold the upper portion of the stud and to tightly seal the opening of the cup-shaped housing,
the lid member having a fifth surface facing the fourth surface of the fixed damping unit,
the second cylindrical portion being fixed along an outer circumference of the opening of the cup-shaped housing, being embedded in and attached by vulcanization to the lid member, and functioning as a stopper in the axial direction of the stud in cooperation with the lid member; and
a zone formed by the fourth surface of the fixed damping unit, the fifth surface of the lid member, and the outer circumferential surface of the stud, the zone including a space portion free from the high viscosity fluid, the zone communicating with the second fluid passage for the high viscosity fluid,
wherein a length of the first cylindrical portion in the axial direction of the stud is larger than a length of a portion of the damping body free from the first cylindrical portion in the axial direction of the stud, wherein, in the lid member, the rubber material fills a portion between the stud and the second cylindrical portion, and wherein when the stud moves, the lid member causes the high viscosity fluid in the zone to flow into the second fluid passage.

5. The liquid seal type fluid-filled mount according to claim 4, wherein an inner circumferential portion of a central opening surrounded by the inner circumferential surface of the damping body has a cross section area which is gradually decreased as a position of the cross section comes near the central opening.

6. The liquid seal type fluid-filled mount according to claim 4, wherein the damping body of the fixed damping unit has a first distance between the inner circumferential surface and the first cylindrical portion and a second distance between the first cylindrical portion and the cup-shaped housing, the first distance being smaller than the second distance.

7. The liquid seal type fluid-filled mount according to claim 4, wherein the thickness of the lid member is so thin that when the stud moves, the lid member elastically moves together with the movement of the stud.

* * * * *